Figure 1:
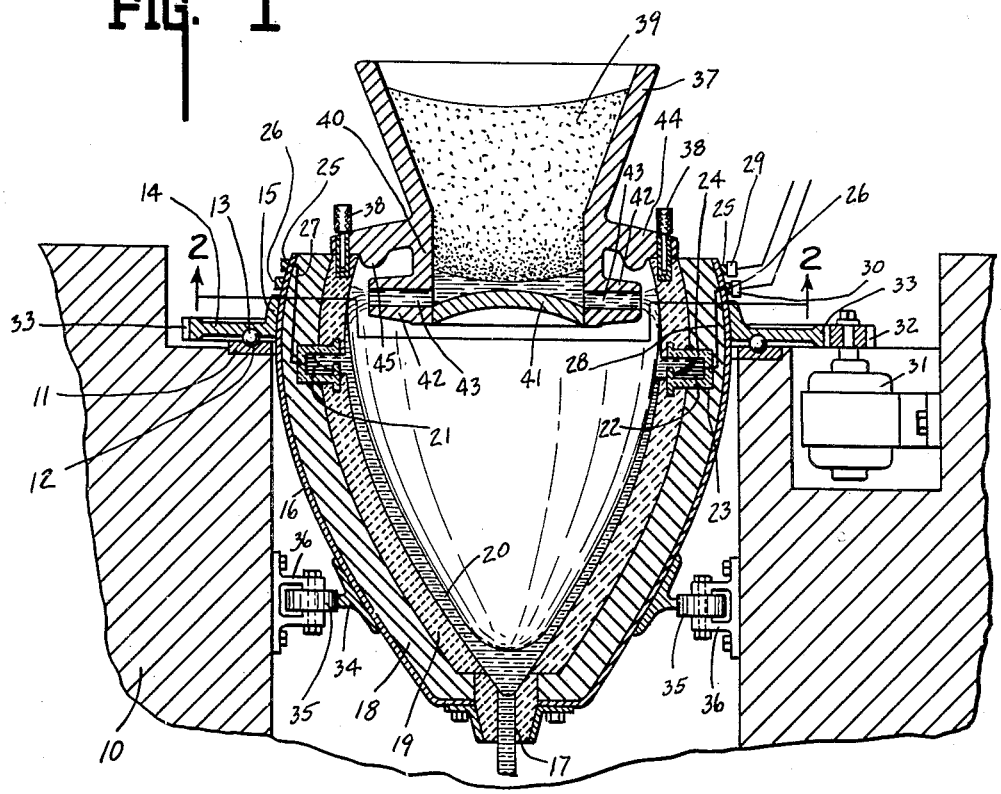

July 16, 1935.  J. FERGUSON  2,008,495
PROCESS OF ELECTRICALLY MELTING AND REFINING GLASS AND APPARATUS THEREFOR
Filed May 18, 1934

INVENTOR.
JOHN FERGUSON.
BY
Lockwood Goldsmith & Galt
ATTORNEYS.

Patented July 16, 1935

2,008,495

UNITED STATES PATENT OFFICE 2,008,495

PROCESS OF ELECTRICALLY MELTING AND REFINING GLASS AND APPARATUS THEREFOR

John Ferguson, Indianapolis, Ind., assignor to Fairmount Glass Works, Inc., Indianapolis, Ind., a corporation Application May 18, 1934, Serial No. 726,272

7 Claims. (Cl. 13—6)

This invention relates to a process of melting and refining glass and the apparatus therefor, comprising a rotary furnace of the general character set forth and described in my co-pending applications, Serial No. 461,163, filed June 14, 1930, entitled Vertical centrifugal glass-melting furnace, and Serial No. 678,606, filed July 1, 1933, entitled Process of electrically melting and refining glass and apparatus therefor.

One object of the invention is to provide a batch feeder for a rotating furnace of this character, wherein a hopper is mounted directly over the furnace for rotation therewith in which the batch is held. The heat from the furnace causes the lower strata of the batch contained in the hopper to melt and become sufficiently fluid to be discharged from the hopper laterally against the upper walls of the furnace through the laterally disposed openings in the lower part of the hopper. The centrifugal force, due to the rapid rotation of the furnace and hopper, causes the preheated batch of molten or viscous material to be thus discharged.

This form of batch feeder tends to become automatic and self-governing and, moreover, it is adapted to regulate the temperature of the glass within the furnace. For instance, if the temperature in the furnace becomes excessive, the radiant heat at the top will cause more batch material to become fluid and will feed more into the furnace, thus tending to reduce the furnace temperature. Furthermore, the heat of the furnace which would otherwise be wasted is conserved and employed for preheating the batch.

Another feature of the invention resides in the use of carbon or graphite dust for electrically starting the furnace instead of gas or oil for preliminary heating. In a rotating furnace of this character, it is particularly desirable to effect the preliminary melting of the batch electrically as distinguished from the use of gas or oil. This is for the reason that flame heating necessitates the furnace being started without the batch feeding hopper, which would have to be mounted on the furnace after it is spinning at a high rate of speed.

This feature of the invention, therefore, resides in the employment of carbon or graphite dust being first placed in the feeding hopper before the batch material. This dust is thrown out on the walls of the furnace to provide a circuit between the electrodes. The circuit being established, the powdered carbon or graphite provides the resistor in which heat is gradually developed. When the furnace has been sufficiently heated thereby, the feeding of the carbon or graphite dust is discontinued and immediately followed by batch feeding to provide the desired molten current conductor under which the operation of the furnace is continued.

Figure 2:
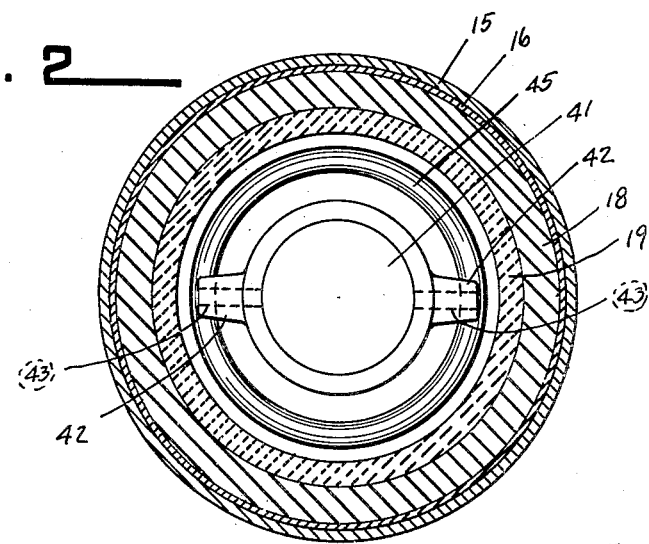

The full nature of the invention will be understood from the accompanying drawing and the following description and claims:

Fig. 1 is a central vertical section through the furnace with the hopper mounted thereon. Fig. 2 is a section taken on the line 2—2 of Fig. 1.

In the drawing, there is illustrated a rotary glass furnace rotatably supported within a well formed within the supporting walls 10 upon which there is provided an annular track 11 serving as a lower ball race provided with a groove 12 in which the balls 13 are adapted to run. The furnace is supported upon the balls 13 by an upper ball race 14 secured about the furnace at its greatest periphery by a ring 15.

The furnace is enclosed within a metal shell 16 tapering to provide a closed bottom having a discharge orifice 17. The shell 16 houses a layer of heat insulating material 18 which in turn encloses a lining of refractory material 19 within which the molten glass 20 is maintained.

At opposite sides of the furnace, approximately at its greatest diameter, there are electrodes 21 and 22. Each of said electrodes comprises a pocket partially surrounded by a metal jacket 23 which may be rectangular in shape. The jacket embraces a lining of refractory material 24, and contains a suitable conducting material, such as molten lead or the like. The conducting material sets back in the pocket, but is open to and in engagement with the molten glass 20 so as to have direct contact therewith.

Surrounding the metal shell 16, but insulated therefrom, there is a pair of slip rings 25 and 26, the ring 25 being electrically connected with the electrode 21 through its jacket 23 by a conductor 27. The ring 26 is similarly connected with electrode 22 through a conductor 28. A brush 29 contacts with the ring 25 for causing current to pass therethrough and through the electrode 21 from one side of the circuit, while a brush 30 engages and makes contact with the ring 26 for causing current to pass through the electrode 22 from the other side of the circuit. Thus, an electric current is caused to pass through the molten glass 20 for heating the same to a high temperature during the rapid rotation of the furnace.

Any suitable means for rotating the furnace may be provided, there being indicated herein an electric motor 31 driving a gear 32 which engages with and drives a ring gear 33 formed about the upper ball race 14. For steadying the furnace and centering it during its rotation in conjunction with the ball races there is provided an annular ring 34 adjacent the lower end thereof which rides in a plurality of thrust bearing rollers 35 mounted on brackets 36 about the inner surface of the supporting walls 10.

Removably mounted over the top of the furnace there is a batch hopper 37 centered thereon for rotation therewith and keyed thereto by the pins 38. Said hopper is upwardly flared to facilitate loading of the batch material therein, as indicated at 39. The lower portion of the hopper is provided with cylindrical walls 40 terminating in an upwardly curved bottom surface 41. Extending radially outward on opposite sides from the lower wall 40 there are discharge spouts 42 having passages 43 leading from the bottom of the hopper flush with the surface 41. Between the cylindrical lower walls 40 and the upper flared walls of the hopper there is an outwardly extending flange 44 which rests upon the top of the furnace and through which the keys 38 extend. Said flange is provided with a lower annular bead 45 which abuts against the upper inner edge of the furnace for centering the hopper thereon.

In operation, the furnace, when cold, is first started by partially filling the hopper with an electric conductor in dust-like or powdered form, such as carbon or graphite. The current is then switched on and the furnace rotated, throwing the dust or graphite outwardly by centrifugal force through the passages 43 until it provides a continuous circuit across the lead electrodes 22 which are then in their solid state. Thus, current is caused to pass between the electrodes through the path created by the carbon or graphite thrown about the inner wall of the furnace by its centrifugal action due to its rotation. This circuit being established, the powdered form of the conductor provides a resistor which gradually develops heat to a sufficiently high degree to melt the batch material. The control of the temperature of the furnace thus created in the starting operation is governed by the voltage applied to the electrodes. The temperature may be read by an optical pyrometer through the discharge orifice 17. This process is continued until the rotating furnace is at a temperature which will melt the glass batch, whereupon the feeding of the graphite dust is discontinued and simultaneously followed by the feeding of the glass batch.

After the batch is fed into the hopper, it will first be discharged through the passages 43, and immediately melted to gradually supplant the carbon or graphite dust with molten glass. The temperature will continue to rise until the bottom of the hopper has become so heated as to preheat the batch therein, resulting in the lower strata of the batch contained in the hopper becoming sufficiently fluid to be discharged in a molten or semi-molten state through the passages 43.

Some oxidation of the graphite or carbon will take place, but it does not readily oxidize until a temperature is reached which is sufficiently high to exceed the temperature required to melt the glass batch. The first run of glass will be discolored, but the same may be withdrawn through the orifice and quickly washed out.

After the starting operation as above described, the batch material continues to be fed into the furnace by the rotation thereof. The lower strata, being preheated to a semi-molten state, is discharged from the hopper into the furnace where it will be spread in a thin layer about the inner wall thereof for providing an electrical resistor of molten glass between the electrodes 21 and 22 which will have become heated to a molten state, as is more specifically set forth and described in the above-mentioned applications.

The invention claimed is:

1. The method of starting an electric glass furnace having spaced electrodes therein, consisting in providing a path between said electrodes of finely divided current conducting material for closing the circuit between said electrodes and creating a resistor for generating heat therein, and thereafter discharging glass making batch material into said furnace upon the heat created by said material being raised to glass melting temperature.

2. The method of starting an electric furnace having spaced electrodes therein, consisting in providing a path between said electrodes of finely divided current conducting material for closing a circuit between said electrodes and creating a resistor for generating heat therein, and thereafter simultaneously discharging said material and feeding glass making batch material into said furnace to be melted for providing a current conducting path upon the furnace being heated to glass melting temperature.

3. The method of starting an electric rotary glass furnace having spaced electrodes therein, consisting in feeding finely divided current conducting material into said furnace until sufficiently heated, and thereafter heating glass making batch material therein.

4. In a rotary glass furnace, means for rotating said furnace about a vertical axis, means for applying heat thereto for maintaining the glass contained therein in a molten state, a hopper mounted over the top and rotatable with said furnace for containing a supply of glass making batch material therein, and a radially extending spout communicating with the bottom of the hopper through which glass may be continuously discharged laterally against the interior wall of the furnace by the centrifugal action due to the rotation thereof.

5. In a rotary glass furnace, means for rotating said furnace, means for applying heat thereto for maintaining the glass contained therein in a molten state, a hopper mounted on and rotatable with said furnace for containing a supply of glass making batch material therein, the upper portion of said hopper being flared upwardly above the furnace and the lower portion thereof extending downwardly into the furnace having a concave bottom surface and oppositely-disposed spouts extending radially from the lower portion of the hopper and in communication with the interior thereof adjacent the concave bottom, whereby the batch material adjacent the bottom will be heated to a viscous state by the heat of the furnace and discharged through said spouts against the interior wall of the furnace by the centrifugal force resulting from the rotation of the furnace and hopper.

6. A method of feeding batch material to a glass furnace rotating about a vertical axis and having an open top, consisting in reducing a portion of the batch material to a molten state before being fed into the furnace, rapidly rotating the molten material and discharging it into the furnace by centrifugal force.

7. In a rotary glass furnace, means for rotating said furnace about a vertical axis, a pair of electrodes mounted within said furnace, a source of electric energy connected with said electrodes, a hopper mounted over the top and rotatable with said furnace for containing a supply of batch material to be fed thereto, and means associated with said hopper for continuously discharging said material radially against the interior wall of the furnace adjacent said electrodes to provide a resistor element therebetween by centrifugal action.

JOHN FERGUSON.